US012627767B2

(12) United States Patent
Ota

(10) Patent No.: US 12,627,767 B2
(45) Date of Patent: May 12, 2026

(54) ELECTRONIC APPARATUS CAPABLE OF OUTPUTTING A PLURALITY OF IMAGES AND CAPABLE OF OUTPUTTING A PART OF AN INPUT IMAGE

(71) Applicant: CANON KABUSHIKI KAISHA, Tokyo (JP)

(72) Inventor: Tomohiro Ota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 263 days.

(21) Appl. No.: 18/533,596

(22) Filed: Dec. 8, 2023

(65) Prior Publication Data

US 2024/0205359 A1 Jun. 20, 2024

(30) Foreign Application Priority Data

Dec. 14, 2022 (JP) ................................. 2022-199393

(51) Int. Cl.
*H04N 5/262* (2006.01)
*H04N 23/63* (2023.01)
*H04N 23/80* (2023.01)

(52) U.S. Cl.
CPC ......... *H04N 5/2628* (2013.01); *H04N 23/632* (2023.01); *H04N 23/635* (2023.01); *H04N 23/815* (2023.01)

(58) Field of Classification Search
CPC .. H04N 5/2628; H04N 23/632; H04N 23/635; H04N 23/815
See application file for complete search history.

(56) References Cited

U.S. PATENT DOCUMENTS

| | | | | |
|---|---|---|---|---|
| 5,777,626 | A * | 7/1998 | Takashima ........... | H04N 5/2628 348/E5.051 |
| 9,258,541 | B2 * | 2/2016 | Choe .................... | H04N 13/106 |
| 2006/0177132 | A1 * | 8/2006 | Jackson ............... | H04N 1/3873 382/173 |
| 2006/0188173 | A1 * | 8/2006 | Zhang .................. | H04N 7/0122 348/E5.111 |
| 2010/0097488 | A1 * | 4/2010 | Suzuki .................. | H04N 5/772 348/222.1 |
| 2013/0108171 | A1 * | 5/2013 | Ptucha ................. | H04N 1/3873 382/195 |
| 2013/0272611 | A1 * | 10/2013 | Nakamura .............. | G06T 11/60 382/175 |
| 2016/0234523 | A1 * | 8/2016 | Hattori ................. | H04N 21/236 |
| 2017/0163929 | A1 * | 6/2017 | Maliuk ................. | H04N 23/635 |
| 2018/0109722 | A1 * | 4/2018 | Laroia .................... | H04N 5/772 |

(Continued)

FOREIGN PATENT DOCUMENTS

JP 2005-175683 A 6/2005

*Primary Examiner* — Chiawei Chen
(74) *Attorney, Agent, or Firm* — Cowan, Liebowitz & Latman, P.C.

(57) ABSTRACT

An electronic apparatus according to the present invention includes at least one memory and at least one processor which function as: an acquisition unit configured to acquire input image data; a first output unit configured to output image data on a first region which is a region of a part of the input image data; and a second output unit configured to output image data on a second region that includes the first region, wherein the second output unit outputs information indicating the first region together with the image data on the second region.

15 Claims, 10 Drawing Sheets

(56) References Cited

U.S. PATENT DOCUMENTS

| | | | |
|---|---|---|---|
| 2019/0289221 A1* | 9/2019 | Kitai | H04N 23/62 |
| 2020/0007956 A1* | 1/2020 | Mathur | G06Q 10/103 |
| 2020/0106985 A1* | 4/2020 | Takahashi | H04N 23/633 |
| 2020/0128194 A1* | 4/2020 | Li | G06V 10/758 |
| 2021/0218928 A1* | 7/2021 | Ise | G06T 3/40 |
| 2021/0352221 A1* | 11/2021 | Ikeda | G06V 10/25 |
| 2022/0172746 A1* | 6/2022 | Ikeda | G11B 27/34 |
| 2022/0353435 A1* | 11/2022 | Cohen-Tidhar | G06T 7/246 |
| 2023/0121654 A1* | 4/2023 | Tangeland | H04L 65/764 |
| | | | 348/14.07 |
| 2024/0223881 A1* | 7/2024 | Fang | H04N 23/635 |
| 2025/0150713 A1* | 5/2025 | Geissler | H04N 23/661 |
| 2025/0227357 A1* | 7/2025 | Oda | H04N 23/635 |
| 2025/0316004 A1* | 10/2025 | Sena | G06V 40/161 |

* cited by examiner

*FIG. 2F*

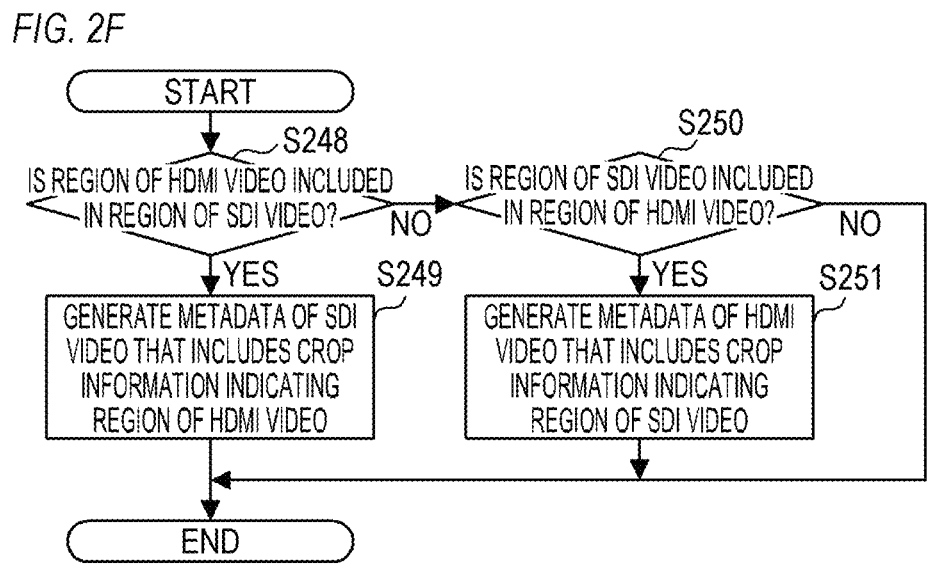

```
                        ┌─────────────┐
                        │    START    │
                        └──────┬──────┘
                               │  ╭── S248                      S250 ──╮
                        ╱──────▼──────╲                   ╱──────▼──────╲
              IS REGION OF HDMI VIDEO INCLUDED    IS REGION OF SDI VIDEO INCLUDED
              ╲── IN REGION OF SDI VIDEO? ──╱ NO  ▶╲── IN REGION OF HDMI VIDEO? ──╱ NO
                        ╲──────┬──────╱                   ╲──────┬──────╱          │
                               │ YES        S249                 │ YES      S251   │
                    ┌──────────▼──────────┐          ┌──────────▼──────────┐       │
                    │ GENERATE METADATA OF SDI │     │ GENERATE METADATA OF HDMI │  │
                    │ VIDEO THAT INCLUDES CROP │     │ VIDEO THAT INCLUDES CROP  │  │
                    │  INFORMATION INDICATING  │     │  INFORMATION INDICATING   │  │
                    │   REGION OF HDMI VIDEO   │     │    REGION OF SDI VIDEO     │  │
                    └──────────┬──────────┘          └──────────┬──────────┘       │
                               │                                │                  │
                               ◀────────────────────────────────┴──────────────────┘
                        ┌──────▼──────┐
                        │     END     │
                        └─────────────┘
```

*FIG. 5A*

| EAV | LN | CRCC | H-ANCILLARY | SAV | V-ANCILLARY |
|---|---|---|---|---|---|
| | | | | | SWITCHING LINE |
| | | | | | V-ANCILLARY |
| | | | | | EFFECTIVE VIDEO REGION |
| | | | | | V-ANCILLARY |

*FIG. 5B*

| FRAME | | | n | n+1 | n+2 | n+3 |
|---|---|---|---|---|---|---|
| V-ANCILLARY | CROP INFORMATION | x | 2452 | 2452 | 248 | 252 |
| | | y | 12 | 12 | 540 | 540 |
| | | w | 1280 | 1280 | 1280 | 1280 |
| | | h | 720 | 720 | 720 | 720 |

*FIG. 5C*

| FRAME | | | n | n+1 | n+2 | n+3 |
|---|---|---|---|---|---|---|
| V-ANCILLARY | CROP ENCLOSURE 1 | x | 244 | 244 | 248 | 252 |
| | | y | 540 | 540 | 540 | 540 |
| | | w | 1280 | 1280 | 1280 | 1280 |
| | | h | 720 | 720 | 720 | 720 |
| | CROP ENCLOSURE 2 | x | 40 | 40 | 40 | 40 |
| | | y | 920 | 910 | 900 | 890 |
| | | w | 1920 | 1920 | 1920 | 1920 |
| | | h | 1080 | 1080 | 1080 | 1080 |
| | CROP ENCLOSURE 3 | x | 2452 | 2452 | 2452 | 2452 |
| | | y | 12 | 12 | 12 | 12 |
| | | w | 1280 | 1280 | 1280 | 1280 |
| | | h | 720 | 720 | 720 | 720 |
| | OUTPUT TARGET ENCLOSURE | | 3 | 3 | 1 | 1 |

ELECTRONIC APPARATUS CAPABLE OF OUTPUTTING A PLURALITY OF IMAGES AND CAPABLE OF OUTPUTTING A PART OF AN INPUT IMAGE

BACKGROUND OF THE INVENTION

Field of the Invention

The present invention relates to an electronic apparatus capable of outputting a plurality of images and capable of outputting a part of an input image.

Description of the Related Art

A crop function for extracting a region of a part of an input image from the input image (clipping, cropping) and outputting the region has been known. The region to be extracted can be changed, and hence the composition and angle of view of an output image can be changed without performing pan operation, tilt operation, and zoom operation of a camera. Japanese Patent Application Publication No. 2005-175683 discloses a digital camera for acquiring images in a plurality of regions of a taken image in response to pressing of a shutter button.

An electronic apparatus that performs live streaming of video may output a first region, which is a region of a part of input video, for live streaming and also output a second region for archive that includes the first region simultaneously. For example, when the composition of live-streamed video (video in the first region that has been set for live streaming) was not optimal, video for archive (video in the second region) is useful for archive streaming and disc creation by resetting the region through post processing. The use of the first region that has been set for live streaming as a start point enables an appropriate region to be reset efficiently, and hence it is preferred that the first region can be easily grasped.

SUMMARY OF THE INVENTION

The present invention provides a technique to easily grasp a first region from image data on a second region that includes the first region. For example, the present invention provides a technique to easily grasp a region that is set for live streaming from video data for archive and enable a preferable region to be set efficiently by using the region as a start point.

An electronic apparatus according to the present invention includes at least one memory and at least one processor which function as: an acquisition unit configured to acquire input image data; a first output unit configured to output image data on a first region which is a region of a part of the input image data; and a second output unit configured to output image data on a second region that includes the first region, wherein the second output unit outputs information indicating the first region together with the image data on the second region.

Further features of the present invention will become apparent from the following description of exemplary embodiments with reference to the attached drawings.

BRIEF DESCRIPTION OF THE DRAWINGS

FIG. 2F is a flowchart illustrating crop information recording processing;
FIGS. 5A to 5C are diagrams illustrating structures of SDI signals.

DESCRIPTION OF THE EMBODIMENTS

Figure 1:
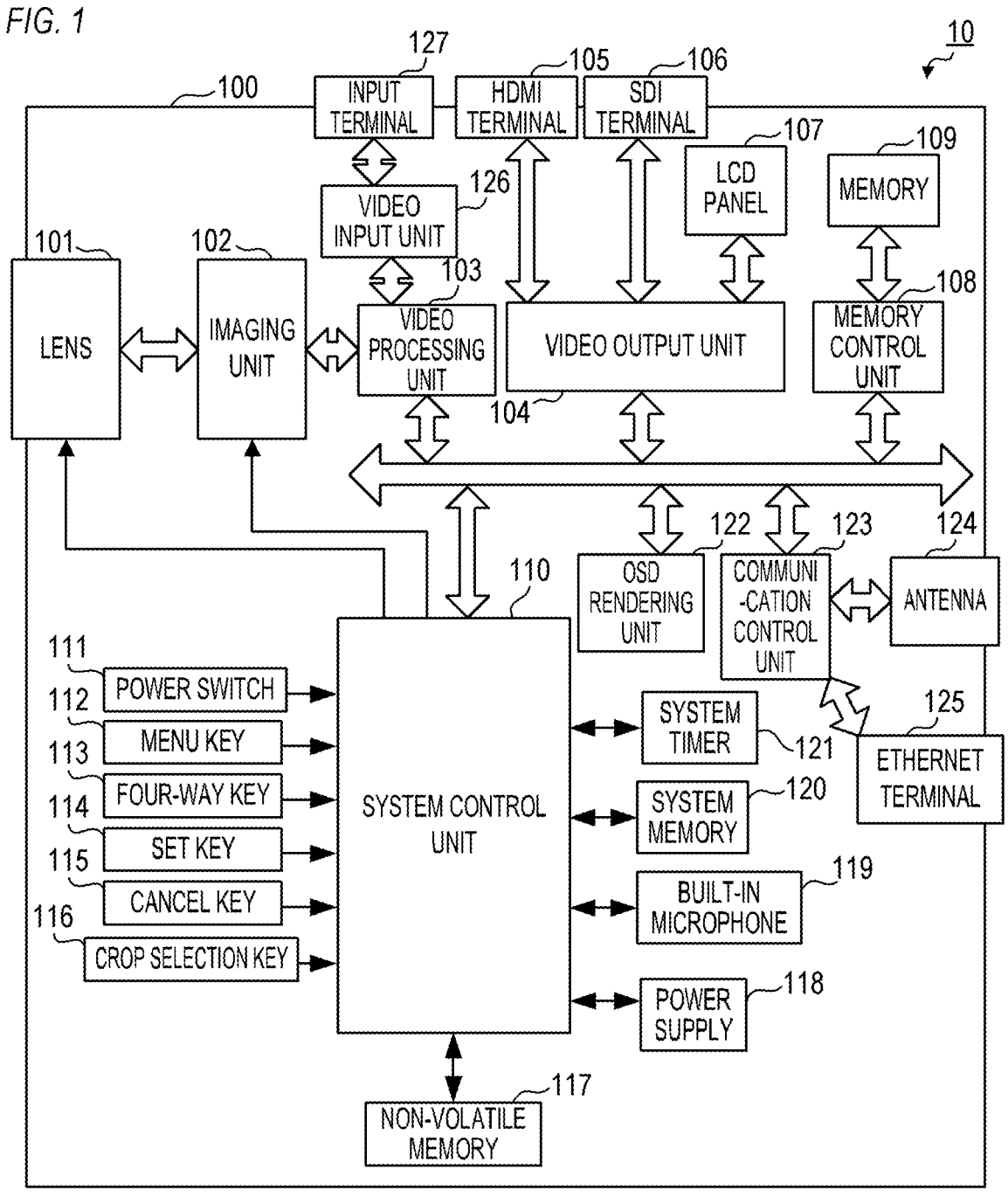
FIG. 1 is a block diagram of a camera.

Embodiments of the present invention are described below. FIG. 1 is a block diagram illustrating a configuration of a camera 10 as an example of an electronic apparatus to which the present invention is applicable.

A housing 100 houses a large number of components of the camera 10 therein.

A lens 101 includes a focus mechanism, a zoom mechanism, a diaphragm, and an anti-shaking mechanism, and performs lens control, such as focus lens driving, diaphragm driving, and anti-shaking lens driving, on the basis of control commands received from a system control unit 110. The lens 101 may be incorporated in the housing 100, or may be an external lens mounted to the housing 100 through a lens mount (not shown).

An imaging unit 102 includes an imaging sensor for converting an optical image condensed by the lens 101 into an electric signal and an A/D converter for converting an analog signal into a digital signal. The imaging sensor takes images at a predetermined frame rate.

A video processing unit 103 acquires video data (input video data, moving image data) from the imaging unit 102 or a video input unit 126 at a predetermined frame rate. The video processing unit 103 performs video processing (image processing), such as resize processing, trimming processing, color conversion processing, and distortion correction processing, on the acquired video data, and stores the video data after the video processing into a memory 109 through a memory control unit 108. The video processing unit 103 may store video data (for example, RAW data) before image processing into the memory 109 as it is.

The video processing unit 103 can use video data output from the imaging unit 102 (video data obtained by imaging) to perform predetermined arithmetic processing. The system control unit 110 performs exposure control, ranging control, anti-shaking control, and AWB (auto white balance) control on the basis of arithmetic results obtained by the video processing unit 103. Examples of the predetermined arithmetic processing include processing for detecting an object, such as a face. In this manner, AF (auto focus) processing, AE (auto exposure) processing, anti-shaking processing, and AWB processing are performed.

The video processing unit 103 can extract (clip, crop) a region of a part of input video (input image) represented (indicated) by input video data (input image data) from the input video), and store video data (image data) in the region in the memory 109. A region (crop region) to be extracted is determined on the basis of an instruction from the system control unit 110. The video processing unit 103 can perform resizing such that a resolution of the extracted video (video data) becomes a resolution suited for output from the video output unit 104.

The video output unit 104 reads one or a plurality of pieces of video stored in the memory 109 from the memory 109 through the memory control unit 108. Then, the video output unit 104 performs superimposing processing and video signal conversion on the read video as necessary, and outputs the video to an HDMI (registered trademark) terminal 105, an SDI terminal 106, an LCD panel 107, or a communication control unit 123. The video output unit 104 may output video data (for example, RAW data) read from the memory 109 to the HDMI terminal 105 or the SDI terminal 106 as it is.

The video output unit 104 can convert additional information (accompanying information) received from the system control unit 110 into metadata, and output the metadata (additional information) to the HDMI terminal 105 or the SDI terminal 106 together with video. In the metadata, a plurality of pieces of information corresponding to (associated with) a plurality of frames of video, such as time codes, can be recorded (included).

The HDMI terminal 105 is a terminal to be connected with an HDMI cable (not shown). Video output from the video output unit 104 can be output to an external device (for example, an external monitor or a recording device) through the HDMI terminal 105 and the HDMI cable. Similarly, the SDI terminal 106 is a terminal to be connected with an SDI cable (not shown). Video output from the video output unit 104 can be output to an external device (for example, an external monitor or a recording device) through the SDI terminal 106 and the SDI cable. Metadata output from the video output unit 104 can also be output to an external device through the HDMI terminal 105 or the SDI terminal 106 (and cable).

The LCD panel 107 (liquid crystal display panel) is a display unit capable of displaying various kinds of video, and, for example, displays video obtained by superimposing OSD (graphics) output from an OSD rendering unit 122 on video output from the video processing unit 103. The LCD panel 107 is, for example, used for monitoring.

The memory control unit 108 controls access to the memory 109 from each unit of the camera 10.

The memory 109 is a storage unit for storing various kinds of data (information) therein, and is used as, for example, a VRAM for storing video data output from the video processing unit 103, the video output unit 104, and the OSD rendering unit 122 therein. The memory 109 has a storage capacity that is enough to store a predetermined period of moving images therein.

The system control unit 110 controls the entire camera 10. For example, the system control unit 110 reads programs stored in a non-volatile memory 117 from the non-volatile memory 117 and executes the programs to control each unit of the camera 10, thereby implementing each operation according to the present embodiment. The system control unit 110 may include a plurality of CPU cores. In this case, tasks written in the programs can be shared by a plurality of CPU cores to be processed (executed).

A power switch 111 is a switch for turning on or off power supply of the camera 10. Depending on the position of the power switch 11, ON or OFF of the power supply is determined, and information on ON or OFF is notified to system control unit 110.

A menu key 112 is a key (button) for making an instruction to display or hide a menu screen on the LCD panel 107. A user can use the menu screen to instruct various kinds of settings (setting changes) in the camera 10.

A four-way key 113 is a key (button) for instructing a direction. For example, a user can use the four-way key 113 to instruct the movement of a cursor displayed on the menu screen or instruct the movement of an enclosure (for example, a crop enclosure indicating a crop region) displayed on video.

A SET key 114 is a key (button) for instructing confirmation of selection and setting. For example, a user can use the SET key 114 to instruct confirmation of a setting item or a set value selected by a cursor on the menu screen.

A cancel key 115 is a key (button) for instructing cancel of various operations and states. For example, a user can use the cancel key 115 to make an instruction to restore the state of the menu screen from the middle state of the setting to the last state or an instruction to hide the menu screen.

A crop selection key 116 is a key (button) for instructing selection of any one of a plurality of crop enclosures displayed on the LCD panel 107 and switching of a crop enclosure to be selected. Video (cropped video) in a crop region corresponding to a selected crop enclosure is output to the outside from, for example, the HDMI terminal 105 or the SDI terminal 106. A user can use the crop selection key 116 to instruct selection of one or both of a region (crop region) of video to be output from the HDMI terminal 105 and a region (crop region) of video to be output from the SDI terminal 106.

The non-volatile memory 117 is a non-volatile memory capable of electrically storing and erasing data (information), and is, for example, an EEPROM. In the non-volatile memory 117, various kinds of data such as constants and programs for the operation of the system control unit 110 are stored. The programs as used herein are programs for executing various kinds of flowcharts described later.

A power supply 118 includes, for example, an AC adapter, a battery, a battery detection circuit, and a DC-DC converter. The power supply 118 controls the DC-DC converter on the basis of an instruction from the system control unit 110 to supply necessary voltage to each unit of the camera 10 for a necessary period.

A built-in microphone 119 converts (collects) voice into an electric signal (voice data). Voice data can be subjected to signal processing by the system control unit 110, superimposed (synthesized) on video by the video output unit 104, and output from the HDMI terminal 105 or the SDI terminal 106.

A system memory 120 is, for example, a RAM. In the system memory 120, various kinds of data (information) such as constants and variables for the operation of the system control unit 110 and programs read from the non-volatile memory 117 are developed. The system memory 120 may be common to the memory 109. In this case, access to the memory 109 (system memory 120) is controlled by the memory control unit 108, and hence a small-capacity memory capable of high-speed access may be coupled to the system control unit 110 separately.

A system timer 121 is a counting unit for measuring time used for various kinds of control and time of a built-in clock.

The OSD rendering unit 122 renders graphics (character string or icon) representing (indicating) the state or setting of the camera 10 and a menu screen onto the memory 109. The graphics such as character strings and icons are stored in the non-volatile memory 117, and the OSD rendering unit 122 reads the graphics from the non-volatile memory 117 and renders the graphics onto the memory 109.

The communication control unit 123 controls communication to an external device. The use of an antenna 124 enables wireless IP communication. The use of an Ethernet terminal 125 enables wired IP communication. By transmitting video output from the video output unit 104 to an external device, the video can be monitored through a network. The communication control unit 123 may receive an operation command generated by operation of an external device, and issue a request corresponding to operation of the menu key 112, the four-way key 113, the SET key 114, the cancel key 115, or the crop selection key 116 to the system control unit 110. The communication control unit 123 may receive a request for setting change from the outside, and issue the request to the system control unit 110.

The antenna 124 is used by the communication control unit 123 for wireless LAN communication.

The Ethernet terminal 125 is used by the communication control unit 123 by wired Ethernet communication.

The video input unit 126 acquires video from an external device through an input terminal 127. The camera 10 may be regarded as an effector device for inputting and outputting video by omitting the lens 101 and the imaging unit 102. Also in this case, the present invention is applicable.

The input terminal 127 is a terminal used to input video into the camera 10 from an external device, and is, for example, an HDMI terminal or an SDI terminal.

Figures 3A, 3B, 3C, 3D:
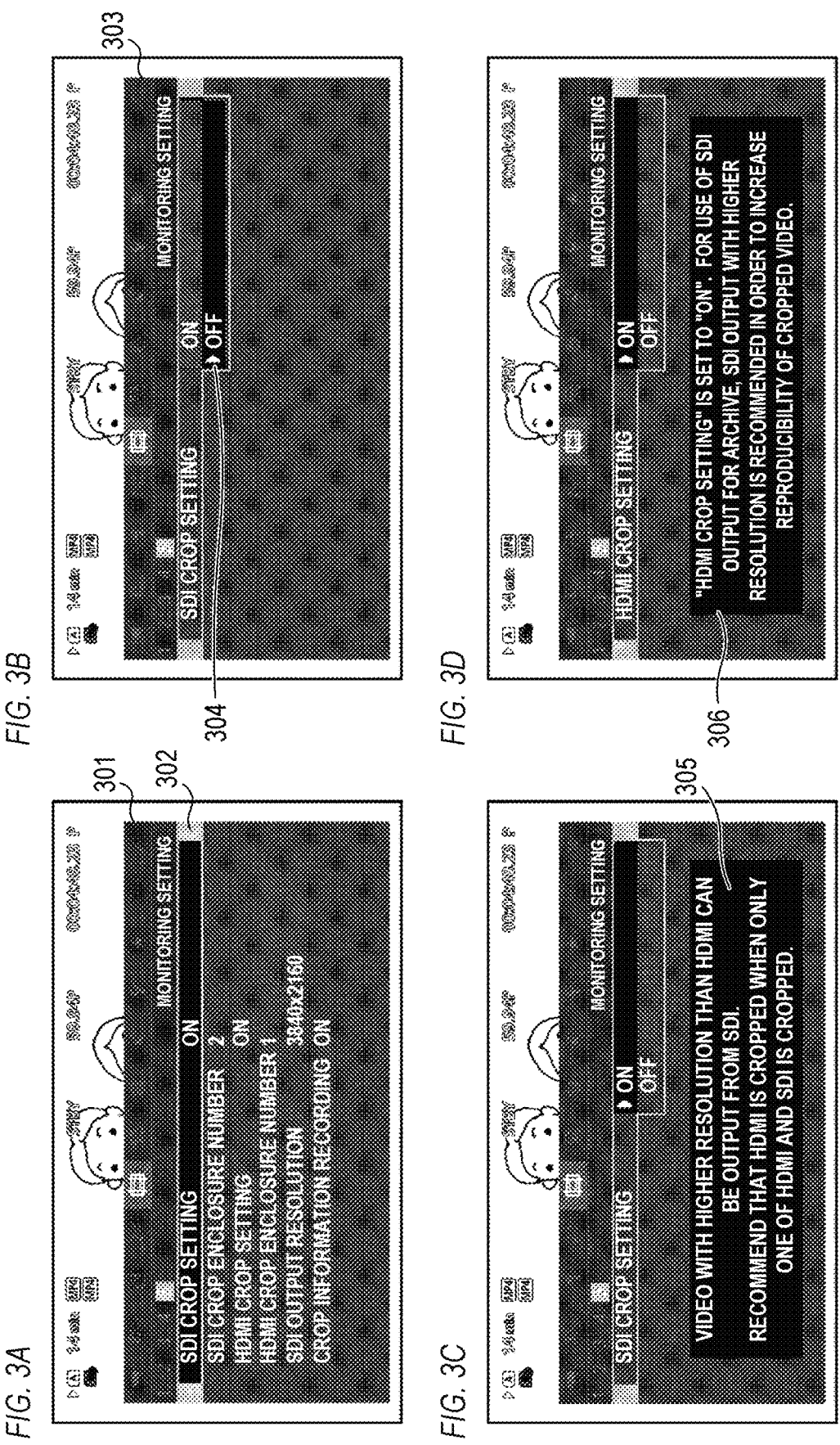
FIGS. 3A to 3D are diagrams illustrating menu screens.
Figure 4:
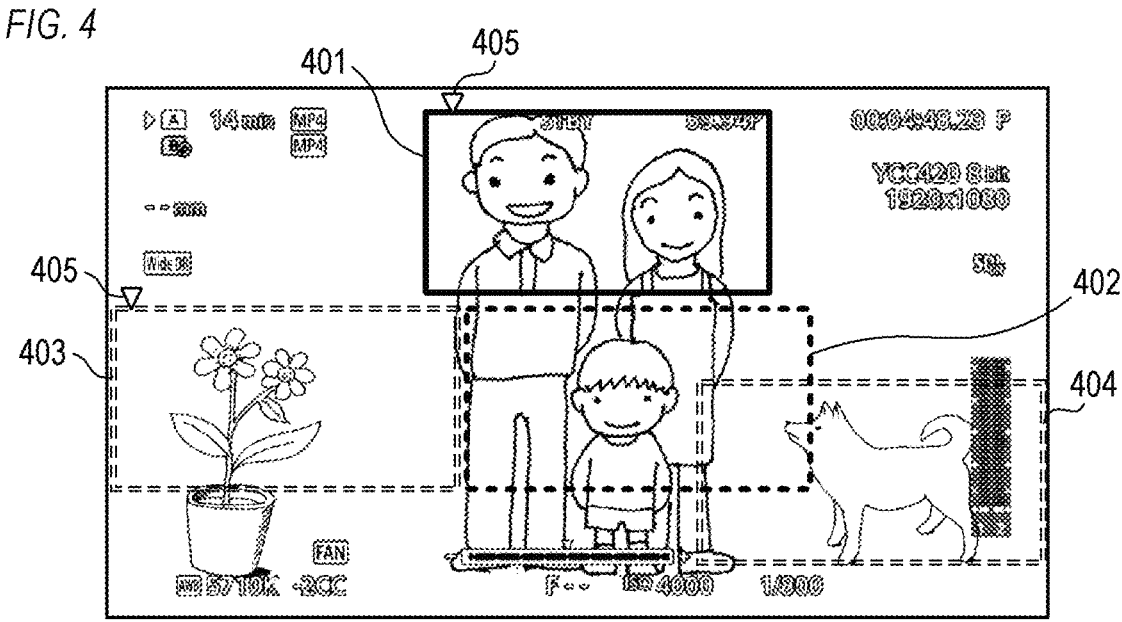
FIG. 4 is a diagram illustrating a photography standby screen.

FIGS. 2A to 2F are flowcharts illustrating processing (operation) of the camera 10. The processing in FIGS. 2A to 2F is implemented when the system control unit 110 develops and executes programs stored in the non-volatile memory 117 onto the system memory 120. FIGS. 3A to 3D illustrate menu screens displayed on the LCD panel 107. FIG. 4 illustrates a photography standby screen displayed on the LCD panel 107.

Figure 2A:
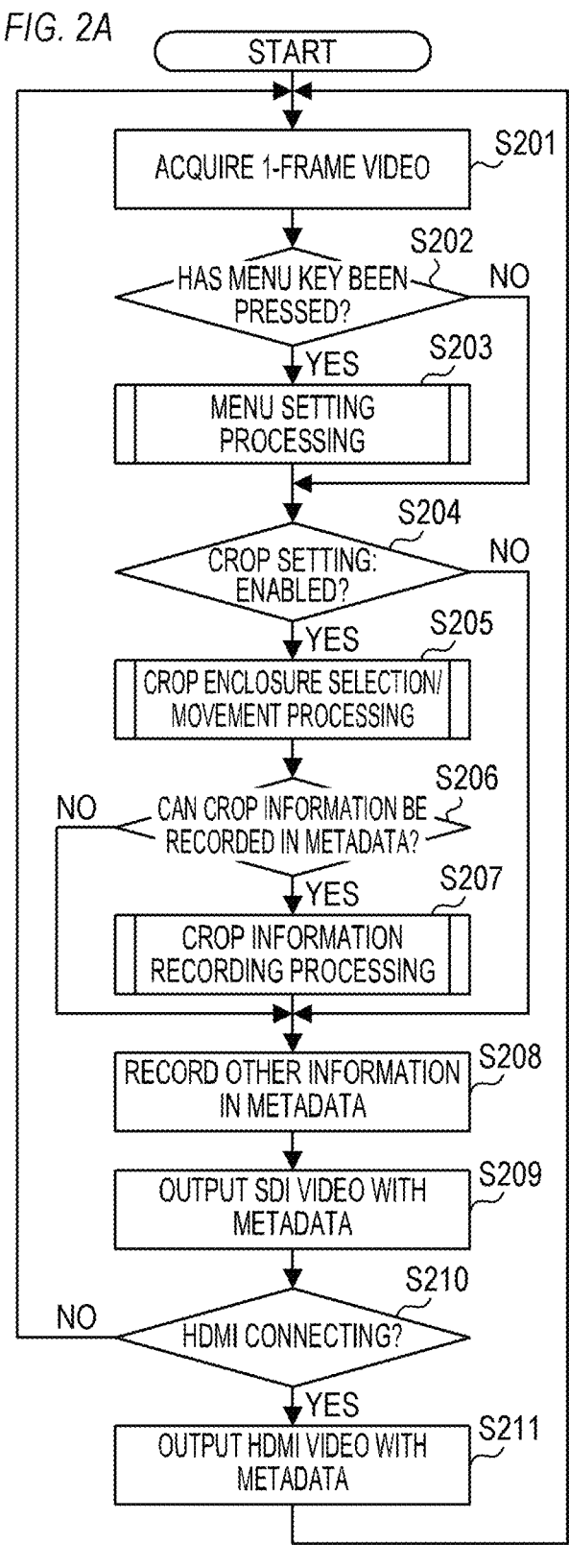
FIG. 2A is a flowchart illustrating overall processing.

FIG. 2A illustrates the overall processing of the camera 10. For example, the overall processing is started when a user operates the power switch 11 to turn on the power supply of the camera 10, and is performed for each frame of power supply input video of the camera 10.

In S201, the system control unit 110 stores video data (1-frame input video data) acquired by the video processing unit 103 into the memory 109 through the memory control unit 108.

In S202, the system control unit 110 determines whether the menu key 112 has been pressed. When the menu key 112 has been pressed, the flow proceeds to S203. Otherwise, the flow proceeds to S204.

In S203, the system control unit 110 performs menu setting processing. In the menu setting processing, the system control unit 110 performs various kinds of settings (setting changes) in accordance with instructions (operations) from a user on the camera 10. Details of the menu setting processing are described later with reference to FIGS. 2B to 2D. Note that the system control unit 110 may perform various kinds of settings (setting changes) on the basis of setting change requests received by the communication control unit 123 from an external device.

In S204, the system control unit 110 reads setting states of HDMI crop setting and SDI crop setting from the system memory 120, and determines whether at least one of the HDMI crop setting and the SDI crop setting is enabled. When at least one of the HDMI crop setting and the SDI crop setting is enabled, the flow proceeds to S205. Otherwise, the flow proceeds to S208. When the HDMI crop setting is enabled, cropped video is output from the HDMI terminal 105. When the HDMI crop setting is disabled, the entire input video is output from the HDMI terminal 105. Similarly, when the SDI crop setting is enabled, cropped video is output from the SDI terminal 106. When the SDI crop setting is disabled, the entire input video is output from the SDI terminal 106.

In S205, the system control unit 110 performs crop enclosure selection/movement processing. Details of the crop enclosure selection/movement processing are described later with reference to FIG. 2E.

In S206, the system control unit 110 determines whether information indicating a crop region (crop information, for example, coordinates) can be recorded in metadata. The determination method is not particularly limited. When predetermined two conditions are both satisfied, the system control unit 110 determines that crop information can be recorded in metadata. Otherwise, the system control unit 110 determines that crop information cannot be recorded in metadata. The first condition is a condition that at least one of video (HDMI video) to be output from the HDMI terminal 105 and video (SDI video) to be output from the SDI terminal 106 is cropped video and one of a region of the HDMI video and a region of the SDI video is included in the other region. When the first condition is not established, a desired effect is not expected if crop information is recorded in metadata. The second condition is a condition that setting to record crop information in metadata has been made. Whether the first condition is satisfied and whether the second condition is satisfied are determined by reading the setting states from the system memory 120. When crop information can be recorded in metadata, the flow proceeds to S207. Otherwise, the flow proceeds to S208.

In S207, the system control unit 110 performs crop information recording processing to record (include) crop information in metadata. Details of the crop information recording processing are described later with reference to FIG. 2F. By performing the determination in S206, the recording of crop information can be controlled such that crop information is recorded in metadata only when crop information is necessary. For example, when both of the HDMI terminal 105 and the SDI terminal 106 are used for live streaming, crop information does not need to be recorded in metadata, and hence the recording of crop information is controlled such that crop information is not recorded in metadata. In this manner, information that is unnecessary in practice can be hidden to implement a workflow without confusion.

In S208, the system control unit 110 records information other than crop information into metadata. Examples of the information other than crop information include a time code and a photography date. The system control unit 110 generates metadata of HDMI video and metadata of SDI video, and stores the metadata in the system memory 120.

In S209, the system control unit 110 inputs video data based on the video data (1-frame input video data) acquired in S201 and the metadata generated by the processing in S207 and S208 to the video output unit 104 in association with each other. Then, the system control unit 110 controls the video output unit 104 such that the pieces of data (video data after the metadata has been added) are output from the SDI terminal 106. As described above, when the SDI crop setting is enabled, cropped video is output from the SDI terminal 106, and when the SDI crop setting is disabled, the entire input video is output from the SDI terminal 106.

In S210, the system control unit 110 determines whether connection between the HDMI terminal 105 and an external device has been established. When connection between the HDMI terminal 105 and an external device has been established, the flow proceeds to S211. Otherwise, the flow proceeds to S201.

In S211, the system control unit 110 inputs video data based on the video data (1-frame input video data) acquired in S201 and the metadata generated by the processing in S207 and S208 to the video output unit 104 in association with each other. Then, the system control unit 110 controls the video output unit 104 such that the pieces of data (video data and metadata) are output from the HDMI terminal 105. As described above, when the HDMI crop setting is enabled, cropped video is output from the HDMI terminal 105, and when the HDMI crop setting is disabled, the entire input video is output from the HDMI terminal 105.

Figure 2B:
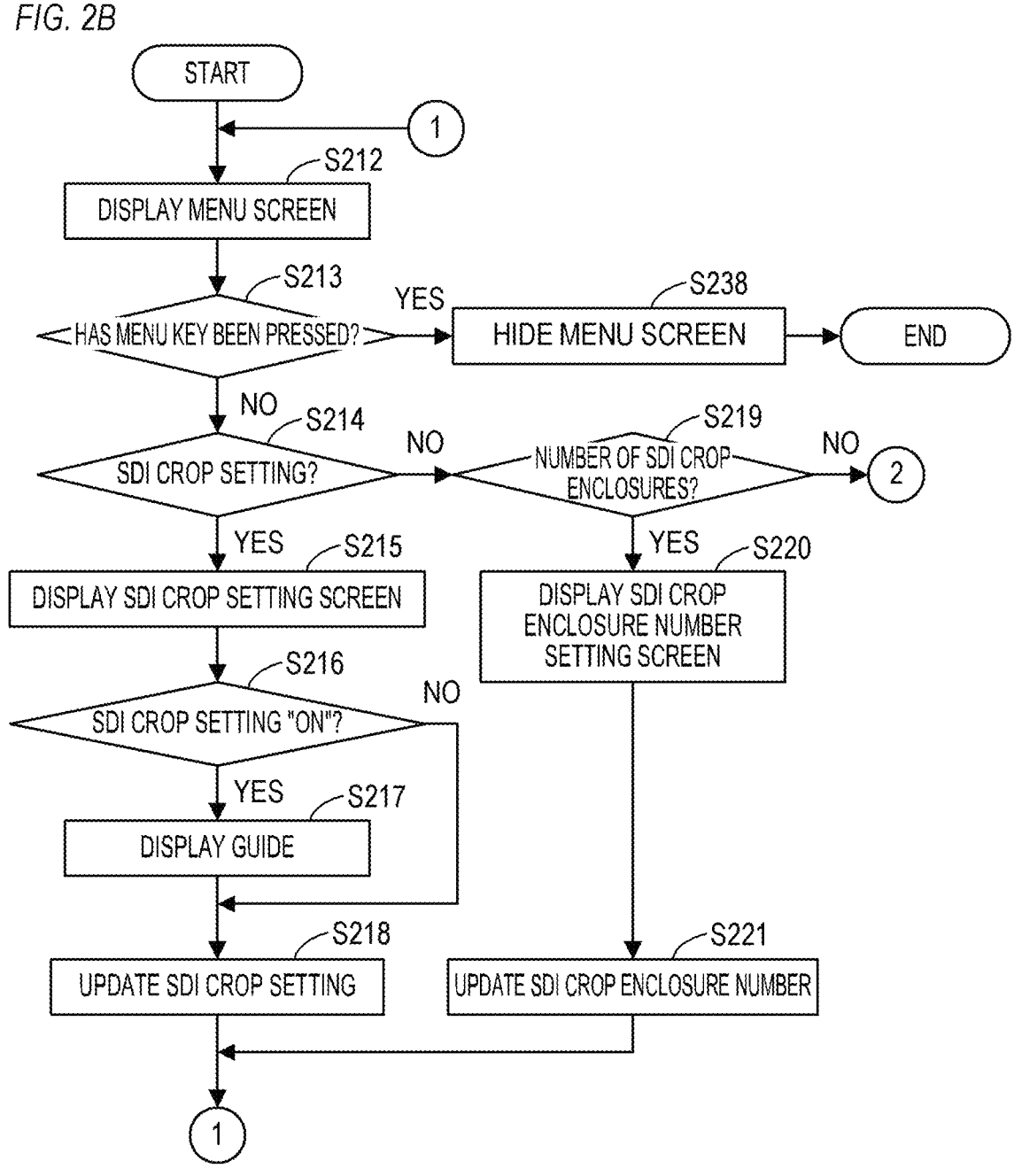
FIGS. 2B to 2D are flowcharts illustrating menu setting processing.
Figure 2C:
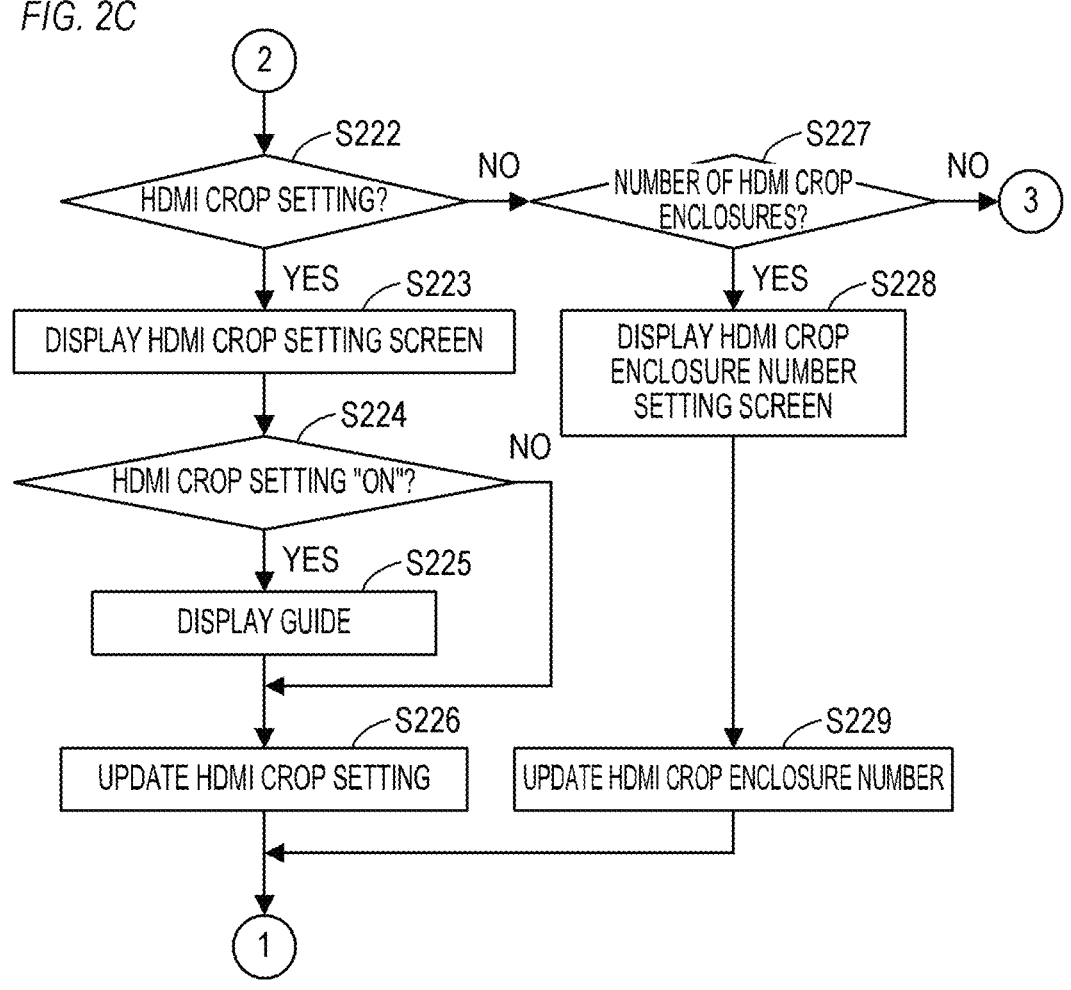
Figure 2D:
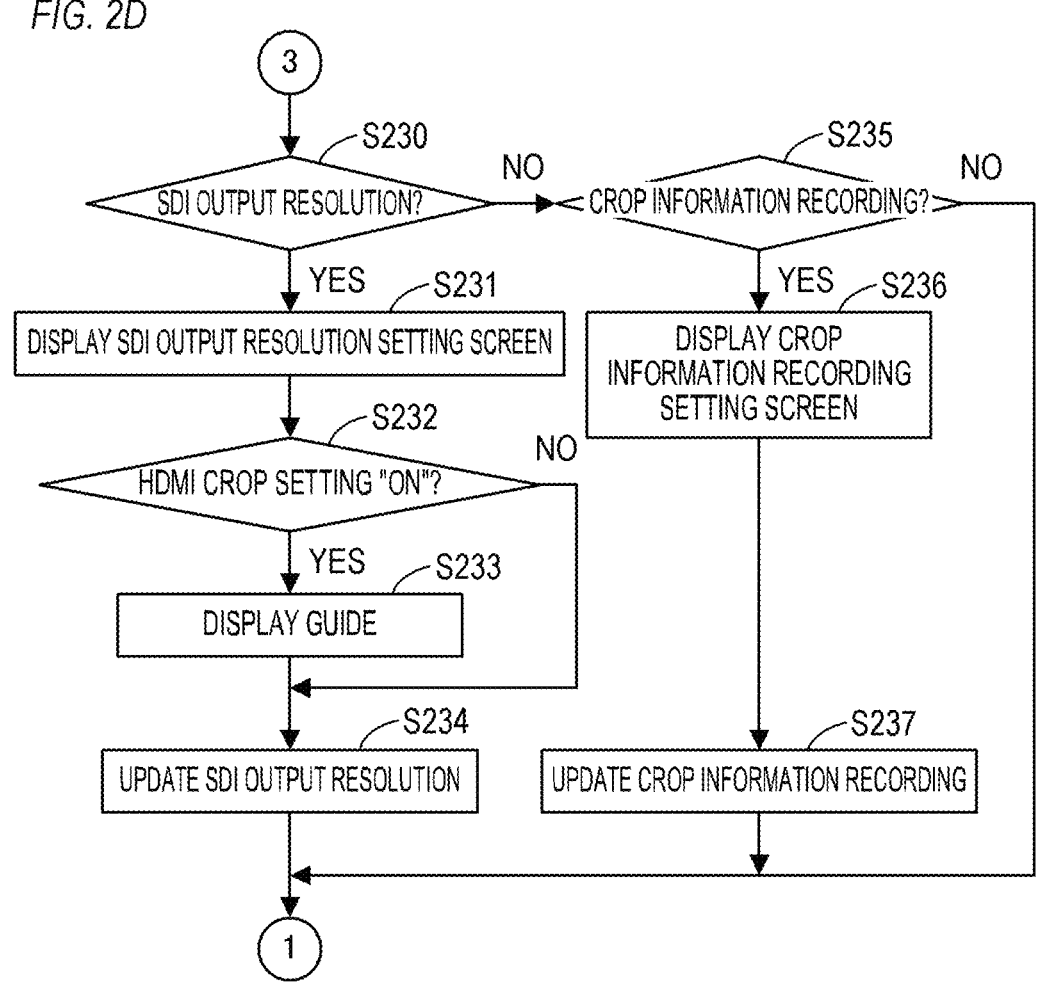

FIGS. 2B to 2D illustrate the menu setting processing in S203.

In S212, the system control unit 110 displays a menu screen on the LCD panel 107. For example, on the basis of an instruction from the system control unit 110, the OSD rendering unit 122 renders a menu screen on the memory 109, and the video output unit 104 reads the menu screen from the memory 109 and displays the menu screen on the LCD panel 107. Here, a menu screen 301 in FIG. 3A is displayed. On the menu screen 301, a plurality of setting items and a cursor 302 for selecting any one of the plurality of setting items are displayed. The plurality of setting items are arranged in an up-down direction. The cursor 302 moves vertically so as to select another setting item in response to a vertical operation of the four-way key 113.

In S213, the system control unit 110 determines whether the menu key 112 has been pressed. When the menu key 112 has been pressed, the flow proceeds to S238. Otherwise, the flow proceeds to S214.

In S214, the system control unit 110 determines whether a confirmation operation of selection of a setting item "SDI crop setting" (pressing of the SET key 114 under a state in which the setting item "SDI crop setting" is selected by the cursor 302) has been performed. When the confirmation operation of the selection of the setting item "SDI crop setting" has been performed, the flow proceeds to S215. Otherwise, the flow proceeds to S219.

In S215, the system control unit 110 controls the menu screen displayed on the LCD panel 107 to transition to an SDI crop setting screen. A user can use the SDI crop setting screen to input (select) the state of the SDI crop setting. Here, the menu screen transitions from the menu screen 301 in FIG. 3A to an SDI crop setting screen 303 in FIG. 3B. On the SDI crop setting screen 303, "ON" (enabled) and "OFF" (disabled) are displayed as the state of the SDI crop setting. On the SDI crop setting screen 303, a cursor 304 for selecting "ON" or "OFF" is also displayed. "ON" and "OFF" are arranged in an up-down direction, and the cursor 304 moves vertically so as to switch the selected state between "ON" and "OFF" in response to a vertical operation of the four-way key 113.

In S216, the system control unit 110 determines whether the state "ON" of the SDI crop setting has been selected by the cursor 304. When the state "ON" of the SDI crop setting has been selected by the cursor 304, the flow proceeds to S217. Otherwise, the flow proceeds to S218.

In S217, the system control unit 110 makes (performs) a notification to prompt a user to disable the SDI crop setting and enable the HDMI crop setting. The notification method is not particularly limited. The system control unit 110 implements the notification by displaying a guide 305 in FIG. 3C. The guide 305 enables a user to grasp the fact that video with a resolution higher than that from the HDMI terminal 105 can be output from the SDI terminal 106. Furthermore, the user can grasp the fact that it is preferred to enable the HDMI crop setting if one of the SDI crop setting and the HDMI crop setting is to be enabled. When the user instructs the setting in accordance with the guide 305, broad video (for example, entire input video) for archive can be output from the SDI terminal 106 and cropped video for live streaming can be output from the HDMI terminal 105.

Furthermore, the shortage of the resolution can be avoided when extracting a part of archived video from the video.

In S218, in response to the pressing of the SET key 114, the system control unit 110 updates the set value (setting state) of the SDI crop setting stored in the system memory 120 to the state ("ON" or "OFF") selected by the cursor 304.

In S219, the system control unit 110 determines whether a confirmation operation of selection of a setting item "number of SDI crop enclosures" (pressing of the SET key 114 under a state in which the setting item "number of SDI crop enclosures" is selected by the cursor 302) has been performed. When the confirmation operation of the selection of the setting item "number of SDI crop enclosures" has been performed, the flow proceeds to S220. Otherwise, the flow proceeds to S222. The number of SDI crop enclosures is the number of candidates of a crop region to be output from the SDI terminal 106.

In S220, the system control unit 110 controls the menu screen displayed on the LCD panel 107 to transition to an SDI crop enclosure number setting screen. A user can use the SDI crop enclosure number setting screen to input (select) the number of SDI crop enclosures.

In S221, the system control unit 110 updates the set value of the number of SDI crop enclosures stored in the system memory 120 in accordance with an instruction from a user using the four-way key 113 and the SET key 114.

In S222, the system control unit 110 determines whether a confirmation operation of selection of a selection item "HDMI crop setting" (pressing of the SET key 114 under a state in which the setting item "HDMI crop setting" is selected by the cursor 302) has been performed. When the confirmation operation of the selection of the setting item "HDMI crop setting" has been performed, the flow proceeds to S224. Otherwise, the flow proceeds to S227.

In S223, the system control unit 110 controls the menu screen displayed on the LCD panel 107 to transition to an HDMI crop setting screen. A user can use the HDMI crop setting screen to input (select) the state of the HDMI crop setting. For example, the HDMI crop setting screen is a screen similar to the SDI crop setting screen, and the state ("ON" (enabled) and "OFF" (disabled)) of the HDMI crop setting and a cursor for selecting "ON" or "OFF" are displayed.

In S224, the system control unit 110 determines whether the state "ON" of the HDMI crop setting has been selected by the cursor. When the state "ON" of the HDMI crop setting has been selected by the cursor, the flow proceeds to S225. Otherwise, the flow proceeds to S226.

In S225, the system control unit 110 makes a notification to prompt a user to set the resolution of SDI video to a predetermined resolution or higher. The notification method is not particularly limited. The system control unit 110 implements the notification by displaying a guide 306 in FIG. 3D. The guide 306 enables a user to grasp the fact that the HDMI crop setting is "ON" (enabled). Furthermore, the user can grasp the fact that it is preferred to set the resolution of video output from the SDI terminal 106 to a predetermined resolution or higher when broad video (for example, entire input video) for archive is output from the SDI terminal 106. When the user instructs the setting in accordance with the guide 306, high-resolution video can be output from the SDI terminal 106. Furthermore, the shortage of the resolution can be avoided when extracting a part of archived video from the video.

In S226, in response to the pressing of the SET key 114, the system control unit 110 updates the set value (setting state) of the HDMI crop setting stored in the system memory 120 to the state ("ON" or "OFF") selected by the cursor.

In S227, the system control unit 110 determines whether a confirmation operation of selection of a setting item "number of HDMI crop enclosures" (pressing of the SET key 114 under a state in which the setting item "number of HDMI crop enclosures" is selected by the cursor 302) has been performed. When the confirmation operation of the selection of the setting item "number of HDMI crop enclosures" has been performed, the flow proceeds to S228. Otherwise, the flow proceeds to S230. The number of HDMI crop enclosures is the number of candidates of a crop region to be output from the HDMI terminal 105.

In S228, the system control unit 110 controls the menu screen displayed on the LCD panel 107 to transition to an HDMI crop enclosure number setting screen. A user can use the HDMI crop enclosure number setting screen to input (select) the number of HDMI crop enclosures.

In S229, the system control unit 110 updates the set value of the number of HDMI crop enclosures stored in the system memory 120 in accordance with an instruction from a user using the four-way key 113 and the SET key 114.

In S230, the system control unit 110 determines whether a confirmation operation of setting of a setting item "SDI output resolution" (pressing of the SET key 114 under a state in which the setting item "SDI output resolution" is selected by the cursor 302) has been performed. When the confirmation operation of the selection of the setting item "number of HDMI crop enclosures" has been performed, the flow proceeds to S231. Otherwise, the flow proceeds to S235. The SDI output resolution is a resolution of SDI video.

In S231, the system control unit 110 controls the menu screen displayed on the LCD panel 107 to transition to an SDI output resolution setting screen. A user can use the SDI output resolution setting screen to input (select) the SDI output resolution.

In S232, the system control unit 110 determines whether the HDMI crop setting is enabled. When the HDMI crop setting is enabled, the flow proceeds to S233. Otherwise, the flow proceeds to S234.

In S233, similarly to S225, the system control unit 110 makes a notification to prompt a user to set the SDI output resolution to a predetermined resolution or higher. For example, a guide 306 in FIG. 3D is displayed. Note that the system control unit 110 may limit the resolution that can be set as the SDI output resolution to be a predetermined resolution or higher. In this manner, high-resolution video can reliably output from the SDI terminal 106. In this case, the guide 306 is not necessarily required to be displayed.

In S234, the system control unit 110 updates the set value of SDI output resolution stored in the system memory 120 in accordance with an instruction from a user using the four-way key 113 and the SET key 114.

In S235, the system control unit 110 determines whether a confirmation operation of selection of a setting item "crop information recording (recording of crop information in metadata)" (pressing of the SET key 114 under a state in which the setting item "crop information recording" is selected by the cursor 302) has been performed. When the confirmation operation of the selection of the setting item "crop information recording" has been performed, the flow proceeds to S236. Otherwise, the flow proceeds to S212. Metadata is added to HDMI video or added to SDI video. Thus, recording of crop information in metadata may be regarded as outputting of crop information to the outside.

In S236, the system control unit 110 controls the menu screen displayed on the LCD panel 107 to transition to a crop information recording setting screen. A user can use the crop information recording setting screen to select whether to record crop information in metadata.

In S237, the system control unit 110 updates the set value of the recording of crop information stored in the system memory 120 in accordance with an instruction from a user using the four-way key 113 and the SET key 114. When the setting is made so as not to record metadata in crop information, even if one of a region of HDMI video and a region of SDI video is included in the other region, crop information is not recorded in metadata and is not output to the outside. In this manner, in a case where information for archive is unnecessary, such as a case where both of the HDMI terminal 105 and the SDI terminal 106 are used for live streaming, confusion caused by output of excessive information can be avoided.

In S238, the system control unit 110 hides the menu screen.

Figure 2E:
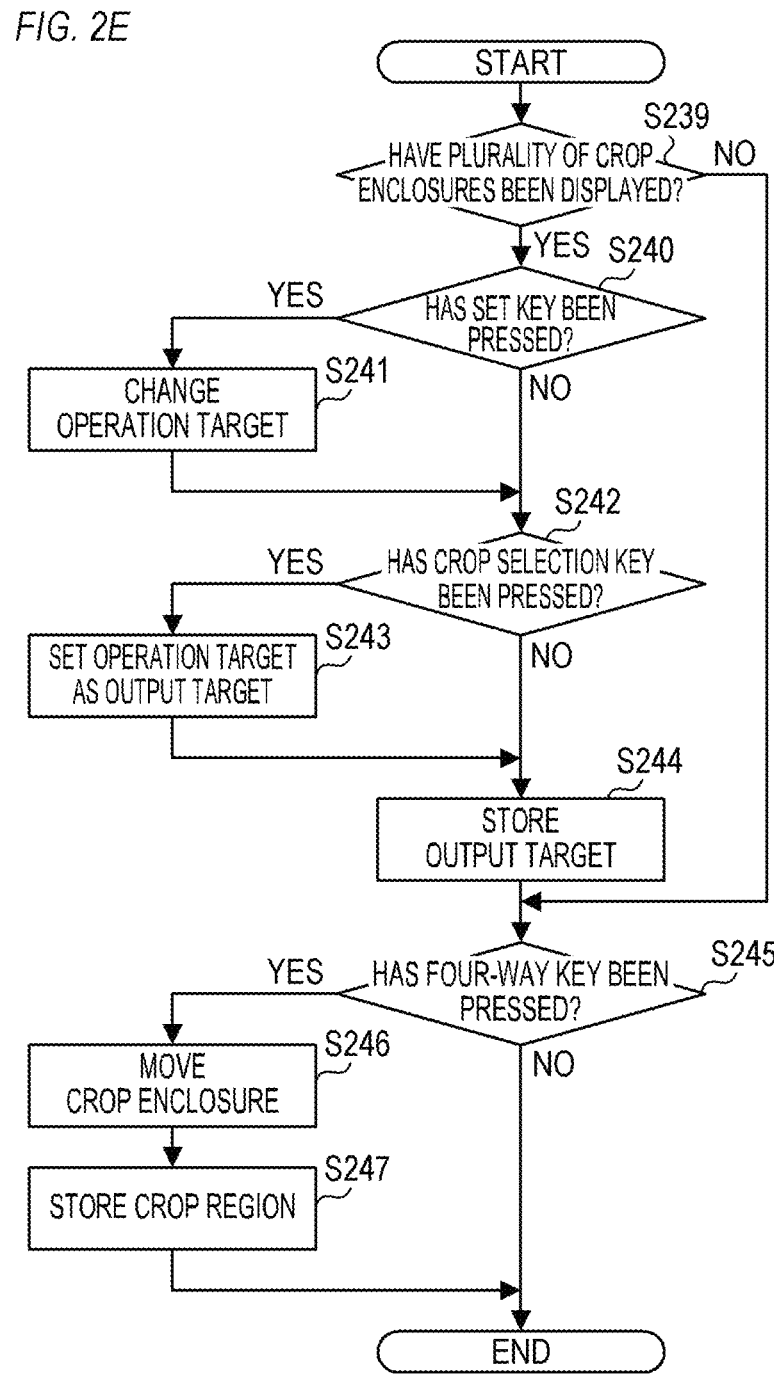
FIG. 2E is a flowchart illustrating crop enclosure selection/movement processing.

FIG. 2E illustrates the crop enclosure selection/movement processing in S205.

In S239, the system control unit 110 reads set values of the number of HDMI crop enclosures and the number of SDI crop enclosures from the system memory 120, and determines whether the total of the set values is 2 or more (whether a plurality of crop enclosures are displayed on the LCD panel 107). When a plurality of crop enclosures are displayed, the flow proceeds to S240. Otherwise, the flow proceeds to S245. Note that, when the SDI crop setting is disabled, the number of SDI crop enclosures is 0 (zero), and when the HDMI crop setting is disabled, the number of HDMI crop enclosures is 0 (zero).

FIG. 4 illustrates an example of a photography standby screen displayed on the LCD panel 107. In FIG. 4, the set value of the number of HDMI crop enclosures is 2, and hence two HDMI crop enclosures 401 and 402 (crop enclosures indicating candidates of a crop region to be output from the HDMI terminal 105) are displayed. Similarly, the set value of the number of SDI crop enclosures is 2, and hence two SDI crop enclosures 403 and 404 (crop enclosures indicating candidates of a crop region to be output from the SDI terminal 106) are displayed. The HDMI crop enclosure 401 is selected as a crop enclosure to be operated, and is indicated by solid line. The HDMI crop enclosure 402, which is not a crop enclosure to be operated, is indicated by single broken line. The SDI crop enclosures 403 and 404, which are not crop enclosures to be operated, are indicated by double broken lines. In this manner, a crop enclosure to be operated, an HDMI crop enclosure that is not to be operated, and an SDI crop enclosure that is not to be operated are displayed in a distinguishable manner. An item 405 is displayed for a crop enclosure to be output. In FIG. 4, the HDMI crop enclosure 401 is set as a crop enclosure to be output (a crop enclosure indicating a crop region to be output from the HDMI terminal 105), and the item 405 is displayed for the HDMI crop enclosure 401. Then, the SDI crop enclosure 403 is set as a crop enclosure to be output (a crop enclosure indicating a crop region to be output from the SDI terminal 106), and the item 405 is displayed for the SDI crop enclosure 403.

In S240, the system control unit 110 determines whether the SET key 114 has been pressed. When the SET key 114 has been pressed, the flow proceeds to S241. Otherwise, the flow proceeds to S242.

In S241, the system control unit 110 changes the crop enclosure to be operated to another crop enclosure. For example, when the SET key 114 is pressed under the state in which the HDMI crop enclosure 401 is selected as a crop enclosure to be operated, the crop enclosure to be operated (crop enclosure indicated by solid line) is changed (switched) from the HDMI crop enclosure 401 to the HDMI crop enclosure 402. The HDMI crop enclosure 401 is no longer a crop enclosure to be operated, and is thus indicated by a single broken line. When the SET key 114 is pressed under the state in which the HDMI crop enclosure 402 is selected as a crop enclosure to be operated, the crop enclosure to be operated is changed from the HDMI crop enclosure 402 to the SDI crop enclosure 403. When the SET key 114 is pressed under the state in which the SDI crop enclosure 403 is selected as a crop enclosure to be operated, the crop enclosure to be operated is changed from the SDI crop enclosure 403 to the SDI crop enclosure 404. When the SET key 114 is pressed under the state in which the SDI crop enclosure 404 is selected as a crop enclosure to be operated, the crop enclosure to be operated is changed from the SDI crop enclosure 404 to the HDMI crop enclosure 401.

In S242, the system control unit 110 determines whether the crop selection key 116 has been pressed. When the crop selection key 116 has been pressed, the flow proceeds to S243. Otherwise, the flow proceeds to S244.

In S243, the system control unit 110 sets (selects) the crop enclosure to be operated as a crop enclosure to be output. When the crop selection key 116 is pressed under a state in which the HDMI crop enclosure 401 is set as a crop enclosure to be output and the HDMI crop enclosure 402 is selected as a crop enclosure to be operated, the crop enclosure to be output is changed from the HDMI crop enclosure 401 to the HDMI crop enclosure 402. When the crop enclosure to be operated is an HDMI crop enclosure, a crop region to be output from the HDMI terminal 105 is determined. When the crop enclosure to be operated is an SDI crop enclosure, a crop region to be output from the SDI terminal 106 is determined.

In S244, the system control unit 110 stores information indicating the crop enclosure to be output in the system memory 120.

In S245, the system control unit 110 determines whether the four-way key 113 has been pressed. When the four-way key 113 has been pressed, the flow proceeds to S246. Otherwise, the crop enclosure selection/movement processing is finished.

In S246, the system control unit 110 moves a crop enclosure to be operated in a direction corresponding to a pressed part (up, down, left, or right) of the four-way key 113.

In S247, the system control unit 110 updates information (for example, coordinates) indicating a crop region corresponding to a crop enclosure to be operated in the information stored in the system memory 120 on the basis of the moved crop enclosure.

FIG. 2F illustrates the crop information recording processing in S207.

In S248, the system control unit 110 determines, on the basis of information stored in the system memory 120, whether a region of HDMI video is included in a region of SDI video. For example, the setting state of the HDMI crop setting, the setting state of the SDI crop setting, and information (for example, coordinates) indicating a crop region to be output are used. When a region of HDMI video is included in a region of SDI video, for example, when the HDMI crop setting is enabled and the SDI crop setting is disabled, the flow proceeds to S249. Otherwise, the flow proceeds to S250.

In S249, the system control unit 110 generates metadata of SDI video including crop information (for example, coordinates) indicating a region (crop region) of HDMI video, and stores the metadata in the system memory 120. The case where the set value of the number of HDMI crop enclosures is 2 or more (a plurality of HDMI crop enclosures are displayed) is assumed. In this case, information indicating only a region of HDMI video may be recorded in the metadata. Information indicating a plurality of regions (a plurality of set regions that are set for input video) corresponding to a plurality of HDMI crop enclosures may be recorded in metadata so that regions of HDMI video can be identified.

FIG. 5A illustrates the structure of an SDI signal. Metadata of SDI video may be added to SDI video as ancillary data. The SDI signal includes an effective video region in which SDI video data is recorded, an H-ancillary region, a V-ancillary region, an EAV region in which an end position of SDI video in the horizontal direction is recorded, and an SAV region in which a start position of SDI video in the horizontal direction is recorded. A region in which crop information is recorded is not particularly limited. For example, crop information is recorded in the V-ancillary region or the H-ancillary region.

FIGS. 5B and 5C illustrate examples of crop information recorded in the V-ancillary region. The crop information in FIG. 5B indicates only a region of HDMI video by using the position (horizontal coordinate x, vertical coordinate y), width w, and height h of the region of HDMI video. The crop information in FIG. 5C indicates a plurality of regions corresponding to a plurality of HDMI crop enclosures. Furthermore, the crop information in FIG. 5C includes, as information for identifying a region of HDMI video, information indicating an HDMI crop enclosure corresponding to a region of HDMI video among a plurality of HDMI crop enclosures.

As illustrated in FIGS. 5B and 5C, in the present embodiment, information indicating a plurality of crop regions (regions of HDMI video) corresponding to a plurality of frames of SDI video is recorded in metadata of SDI video. Then, for each frame of SDI video, information indicating a crop region corresponding to the frame is output to the outside together with SDI video at the frame. Pieces of information indicating a plurality of crop regions corresponding to a plurality of frames of SDI video may be output collectively (without being divided on a frame basis).

Information indicating a crop region corresponding to 1 frame may be regarded as crop information, and information indicating a plurality of crop regions corresponding to a plurality of frames may be regarded as crop information. In the present embodiment, the frame rate of input video, the frame rate of HDMI video, and the frame rate of SDI video are the same, but may be different. When the crop region is not changeable, crop information may be output only once.

In S249, the system control unit 110 does not record crop information in metadata of HDMI video. A region of HDMI video does not include a region of SDI video, and the possibility that HDMI video is video for archive is low. By preventing crop information from being recorded in metadata of video for which information for archive is unnecessary, confusion caused by output of excessive information can be avoided.

In S250, the system control unit 110 determines, on the basis of information stored in the system memory 120, whether a region of SDI video is included in a region of HDMI video. For example, the setting state of the HDMI crop setting, the setting state of the SDI crop setting, and information (for example, coordinates) indicating a crop region to be output are used. When a region of SDI video is included in a region of HDMI video, for example, when the HDMI crop setting is disabled and the SDI crop setting is enabled, the flow proceeds to S251. Otherwise, the crop information recording processing is finished.

In S251, the system control unit 110 generates metadata of HDMI video that includes crop information (for example, coordinates) indicating a region (crop region) of SDI video, and stores the metadata in the system memory 120. The case where the set value of the number of SDI crop enclosures is 2 or more (a plurality of SDI crop enclosures are displayed) is assumed. In this case, information indicating only a region of SDI video may be recorded in the metadata. Information indicating a plurality of regions (a plurality of set regions that are set for input video) corresponding to a plurality of SDI crop enclosures may be recorded in metadata such that regions of SDI video can be identified.

In the present embodiment, information indicating a plurality of crop regions (regions of SDI video) corresponding to a plurality of frames of HDMI video is recorded in metadata of HDMI video. Then, for each frame of HDMI video, information indicating a crop region corresponding to the frame is output to the outside together with HDMI video at the frame. Pieces of information indicating a plurality of crop regions corresponding to a plurality of frames of HDMI video may be output collectively (without being divided on a frame basis).

In S251, the system control unit 110 does not record crop information in metadata of SDI video. A region of SDI video does not include a region of HDMI video, and the possibility that SDI video is video for archive is low. By preventing crop information from being recorded in metadata of video for which information for archive is unnecessary, confusion caused by output of excessive information can be avoided.

As described above, according to the present embodiment, when a region of HDMI video is included in a region of SDI video, crop information indicating the region of HDMI video is output to the outside together with SDI video. In this manner, a region that has been set for live streaming of HDMI video (region of HDMI video) can be easily grasped from SDI video for archive and crop information output together with the SDI video. Furthermore, an appropriate region can be efficiently set by using a region of HDMI video as a start point.

Note that information indicating a plurality of crop regions (regions of HDMI video) corresponding to a plurality of frames of SDI video may be output together with SDI video. In this manner, the behavior of movement and change of a crop region can be easily reproduced from SDI video and information indicating a plurality of crop regions.

Information indicating a region of HDMI video may be output together with SDI video. In this manner, information to be output to the outside can be reduced to the minimum necessary. Information indicating a plurality of set regions that are set for input video (SDI video) may be output together with SDI video such that regions of HDMI video can be identified. In this manner, a region can be easily switched among a plurality of set regions from SDI video and information indicating the plurality of set regions, and hence a preferable region can be set more efficiently.

A region of SDI video that includes a region of HDMI video is not necessarily required to be the entire region of input video, and may be a region of a part of input video. Depending on environments where the camera 10 is installed, a region of a part of input video may be unnecessary for archive. The amount of data of SDI video may be reduced. In such a case, it is preferred to set a region of a part of input video as a region of SDI video. When a region of SDI video is a region of a part of input video, it is preferred that crop information be relative information indicating a region of HDMI video with reference to a region of SDI video. In this manner, a region of HDMI video can be easily grasped similarly to the case where a region of SDI video is the entire region of input video. The reason why a region of a part of input video is set as a region of SDI video is not particularly limited. For example, a region of a part of input video may be set as a region of SDI video in order to obtain SDI video having a predetermined aspect ratio. A region of a part of input video may be set as a region of SDI video for the purpose of electronic stabilization.

HDMI video in the case where HDMI crop setting is disabled may be the same as or different from SDI video in the case where SDI crop setting is disabled. Input video, HDMI video, and SDI video are not necessarily required to be moving images, and may be still images. SDI video that includes a region of HDMI video may be output to the outside while being added with metadata including crop information. SDI video and crop information may be individually output.

Setting may be made such that a region of SDI video is included in a region of HDMI video, and the role of the HDMI terminal 105 and the role of the SDI terminal 106 may be replaced. In such a case, crop information indicating a region of SDI video is output to the outside together with HDMI video. By enabling the role of the HDMI terminal 105 and the role of the SDI terminal 106 to be replaced, flexible response can be made to a situation where at least one of the role of the HDMI terminal 105 and the role of the SDI terminal 106 is limited depending on an external device and installation conditions.

Note that various kinds of control described above as being performed by the system control unit 110 may be performed by at least one piece of hardware (for example, at least one processor and/or at least one circuit). One piece of hardware may control the entire apparatus, or a plurality of pieces of hardware may share the processing to control the entire apparatus.

While the embodiments of the present invention have been described in detail above, the present invention is not limited to the particular embodiments, and various forms in the range not departing from the gist of the invention are included in the present invention. Furthermore, the above-mentioned embodiments are merely an embodiment of the present invention, and the embodiments can be combined as appropriate.

In the above-mentioned embodiments, the case where the present invention is applied to an imaging apparatus (digital camera) has been described as an example. However, the present invention is not limited to an imaging apparatus, and the present invention is applicable to any electronic apparatus capable of outputting a plurality of images and capable of outputting a part of an input image. For example, the present invention is applicable to a personal computer, a PDA, a mobile phone terminal, a mobile image viewer, a printing apparatus, a digital photo frame, a music player, a game machine, and an electronic book reader. Furthermore, the present invention is also applicable to a video player, a display apparatus (including a projection apparatus), a tablet terminal, a smartphone, an AI speaker, a home electrical apparatus, and an on-vehicle apparatus.

According to the present invention, a first region can be easily grasped from image data in a second region that includes the first region. For example, a region that is set for live streaming can be easily grasped from video data for archive, and the region can be used as a start point to set a preferable region efficiently.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-199393, filed on Dec. 14, 2022, which is hereby incorporated by reference herein in its entirety.

What is claimed is:

1. An electronic apparatus comprising at least one memory and at least one processor which function as:

an acquisition unit configured to acquire input image data;

a first output unit configured to output image data on a first region which is a region of a part of the input image data; and a second output unit configured to output image data on a second region that includes the first region, wherein:

the first output unit outputs image data on the first region or image data on a third region;

the second output unit outputs image data on the second region or image data on a fourth region;

the fourth region is a region of a part of the input image data;

the third region is a region that includes the fourth region;

in a case where the first output unit outputs the image data on the first region and the second output unit outputs the image data on the second region, the second output unit outputs information indicating the first region together with the image data on the second region; and in a case where the first output unit outputs the image data on the third region and the second output unit outputs the image data on the fourth region, the first output unit outputs information indicating the fourth region together with the image data on the third region.

2. The electronic apparatus according to claim 1, wherein the at least one memory and the at least one processor further function as an addition unit configured to add metadata including the information indicating the first region to the image data on the second region, and the second output unit outputs image data on the second region to which the metadata has been added.

3. The electronic apparatus according to claim 1, wherein:

each of the input image data, the image data on the first region, and the image data on the second region is moving image data;

the first region is changeable; and the second output unit outputs, together with moving image data on the second region, information indicating a plurality of first regions respectively corresponding to a plurality of frames in the moving image data.

4. The electronic apparatus according to claim 3, wherein the second output unit outputs, for each frame in the moving image data on the second region, information indicating a first region corresponding to the frame together with image data on the second region at the frame.

5. The electronic apparatus according to claim 1, wherein the at least one memory and the at least one processor further function as a selection unit configured to select, as the first region, any one of a plurality of set regions that are set for the input image data.

6. The electronic apparatus according to claim 5, wherein the second output unit outputs, together with the image data on the second region, information indicating the plurality of set regions such that the first region is identifiable.

7. The electronic apparatus according to claim 1, wherein the at least one memory and the at least one processor further function as a setting unit configured to set a resolution of the image data on the second region in accordance with an instruction from a user, and the resolution set by the setting unit is limited to be equal to or higher than a predetermined resolution.

8. The electronic apparatus according to claim 1, wherein the at least one memory and the at least one processor further function as:

a setting unit configured to set a resolution of the image data on the second region in accordance with an instruction from a user; and a control unit configured to perform control to perform a notification to prompt the user to set the resolution of the image data on the second region to be a predetermined resolution or higher.

9. The electronic apparatus according to claim 1, wherein the second region is an entire region of the input image data.

10. The electronic apparatus according to claim 1, wherein:

the second region is a region of a part of the input image data; and the second output unit outputs relative information indicating the first region with reference to the second region together with the image data on the second region.

11. The electronic apparatus according to claim 1, wherein:

the second output unit is capable of outputting image data with a resolution higher than a resolution from the first output unit; and the at least one memory and the at least one processor further function as:

a setting unit configured to set, in accordance with an instruction from a user, which of image data on the first region and image data on the third region is output from the first output unit and which of image data on the second region and image data on the fourth region is output from the second output unit; and a control unit configured to perform control to perform a notification to prompt the user to perform setting so as to output the image data on the first region from the first output unit and output the image data on the second region from the second output unit.

12. The electronic apparatus according to claim 1, wherein:

the first region does not include the fourth region;

the fourth region does not include the first region; and in a case where the first output unit outputs the image data on the first region and the second output unit outputs the fourth region, the first output unit does not output information indicating the fourth region and the second output unit does not output information indicating the first region.

13. The electronic apparatus according to claim 1, wherein the at least one memory and the at least one processor further function as a setting unit configured to set whether to output information indicating the first region.

14. A control method of an electronic apparatus, comprising:

acquiring input image data;

outputting image data on a first region which is a region of a part of the input image data; and outputting image data on a second region that includes the first region, wherein:

image data on the first region or image data on a third region is outputted;

image data on the second region or image data on a fourth region is outputted;

the fourth region is a region of a part of the input image data;

the third region is a region that includes the fourth region;

in a case where the image data on the first region and the image data on the second region are outputted, information indicating the first region is outputted together with the image data on the second region; and in a case where the image data on the third region and the image data on the fourth region are outputted, information indicating the fourth region is outputted together with the image data on the third region.

15. A non-transitory computer readable medium that stores a program, wherein the program causes a computer to execute a control method of an electronic apparatus, the control method comprising:

acquiring input image data;

outputting image data on a first region which is a region of a part of the input image data; and outputting image data on a second region that includes the first region, wherein:

image data on the first region or image data on a third region is outputted;

image data on the second region or image data on a fourth region is outputted;

the fourth region is a region of a part of the input image data;

the third region is a region that includes the fourth region;

in a case where the image data on the first region and the image data on the second region are outputted, information indicating the first region is outputted together with the image data on the second region; and in a case where the image data on the third region and the image data on the fourth region are outputted, information indicating the fourth region is outputted together with the image data on the third region.

* * * * *